(No Model.) 4 Sheets—Sheet 1.
G. F. BROTT.
MACHINE FOR PRESSING PLASTIC OR OTHER CONDITIONED MATERIAL INTO BLOCKS.
No. 266,013. Patented Oct. 17, 1882.
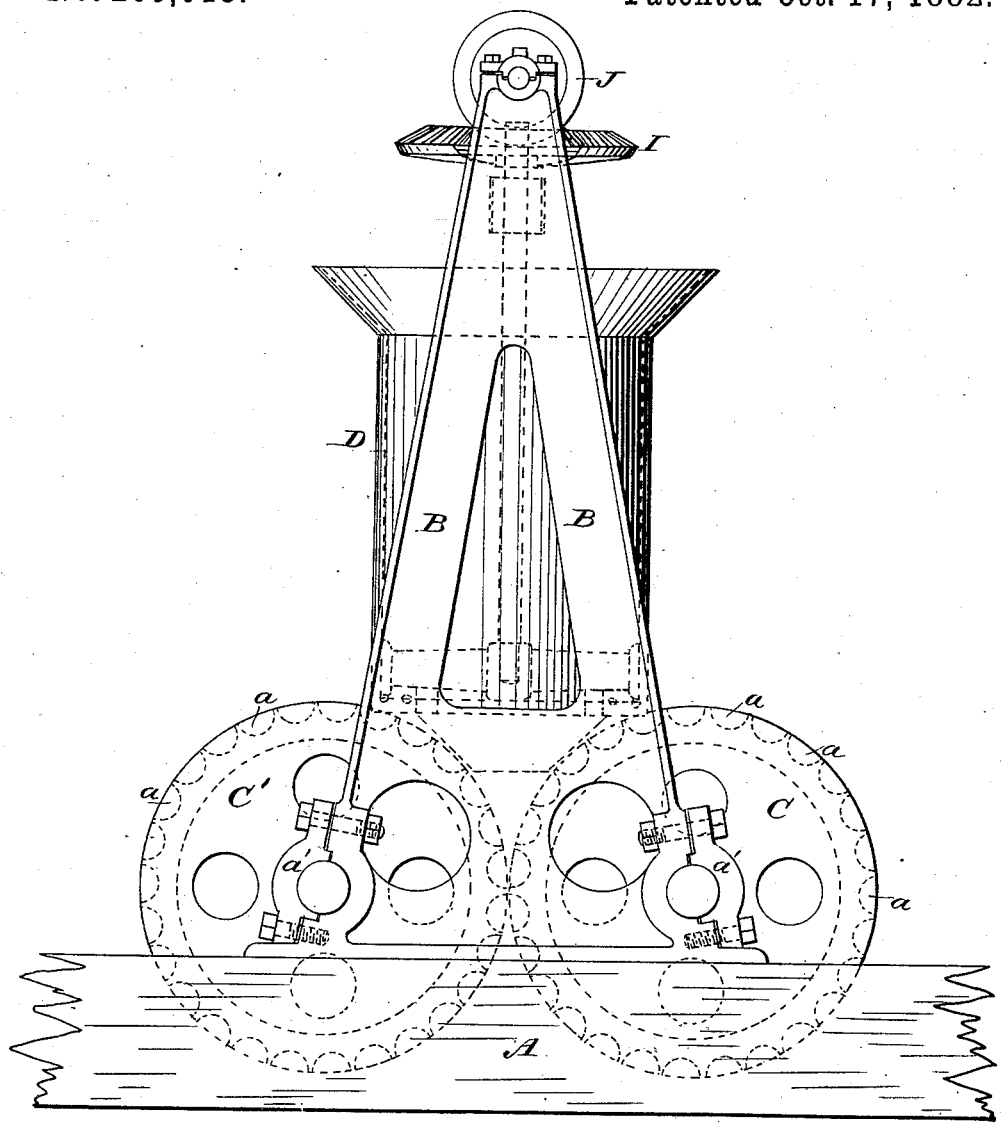
Fig. 1.
Fig. 6.
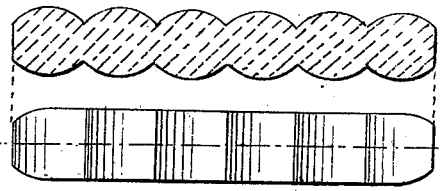
WITNESSES
J. C. Brecht
D. F. Stelcher
INVENTOR
George F. Brott

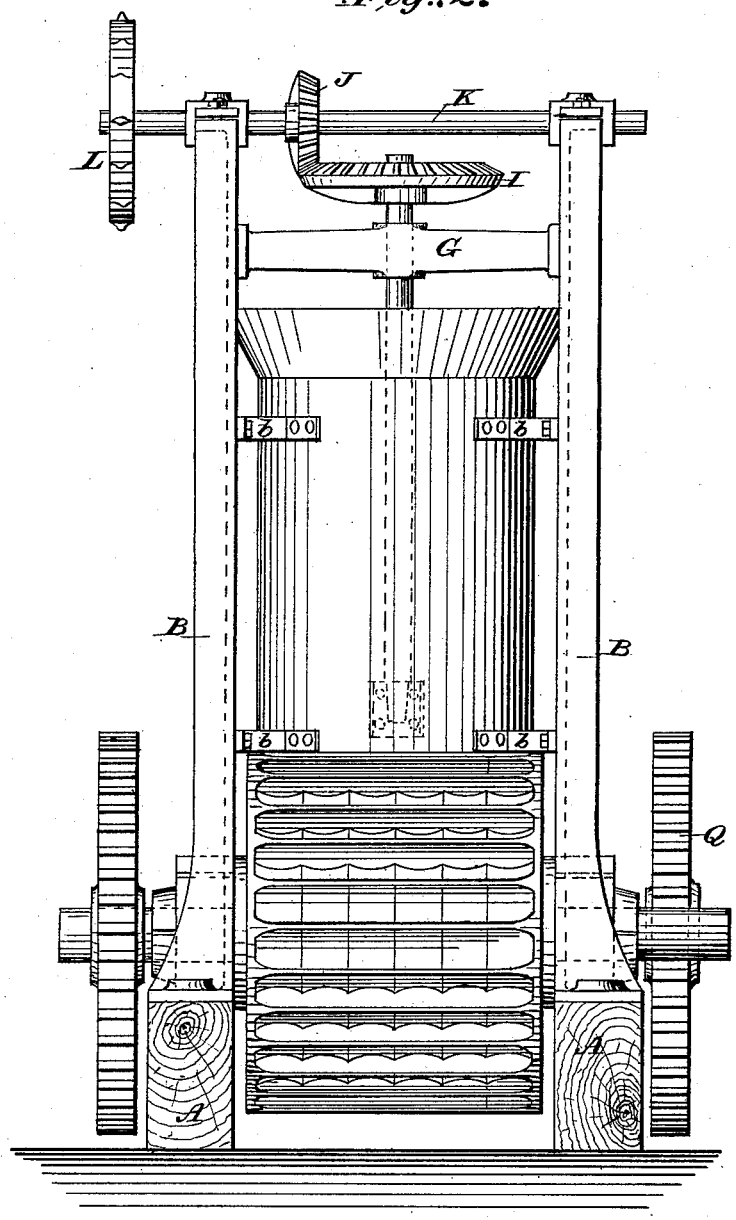

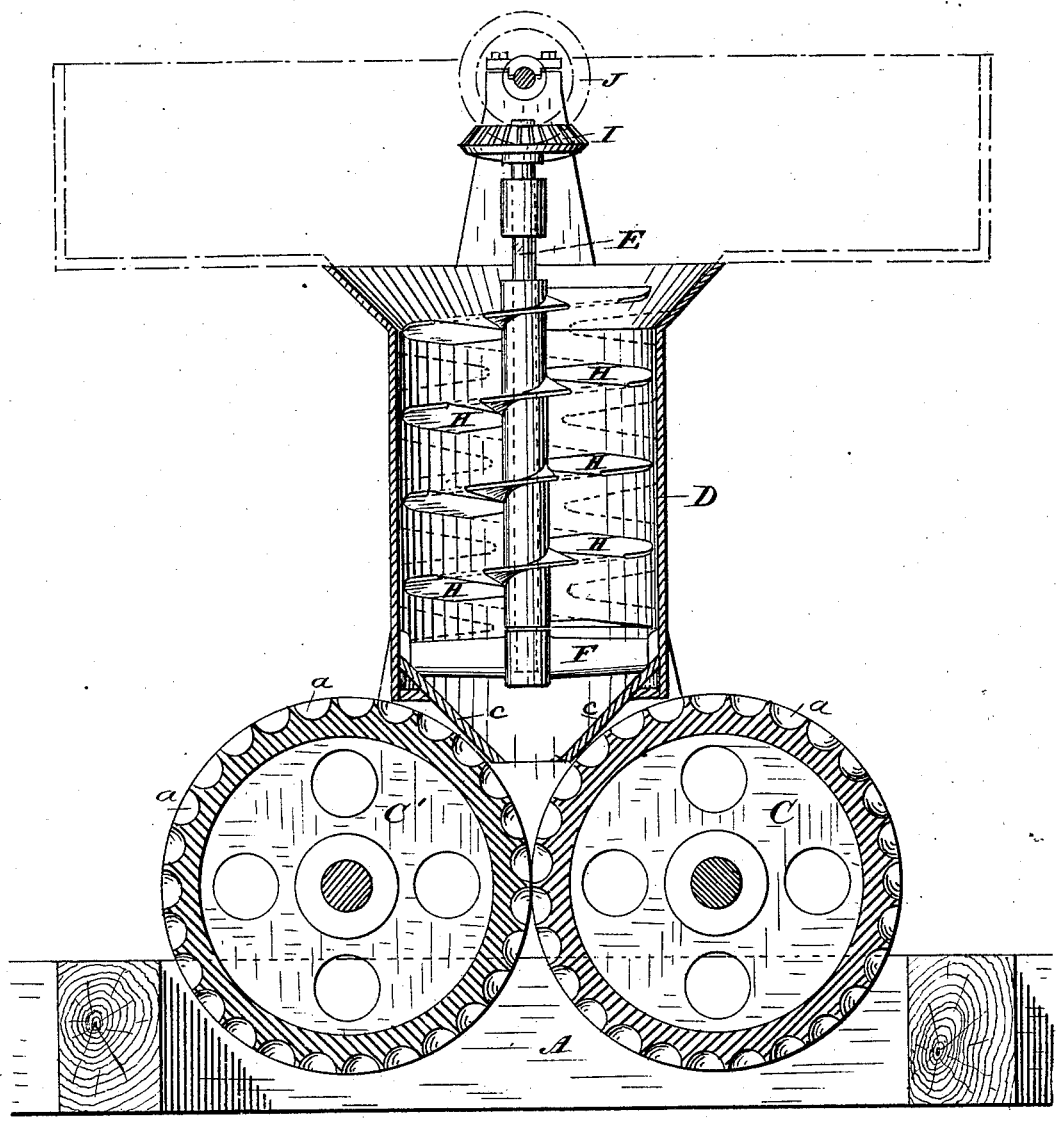

(No Model.)  4 Sheets—Sheet 4.
G. F. BROTT.
MACHINE FOR PRESSING PLASTIC OR OTHER CONDITIONED MATERIAL INTO BLOCKS.
No. 266,013.  *Fig. 4.*  Patented Oct. 17, 1882.
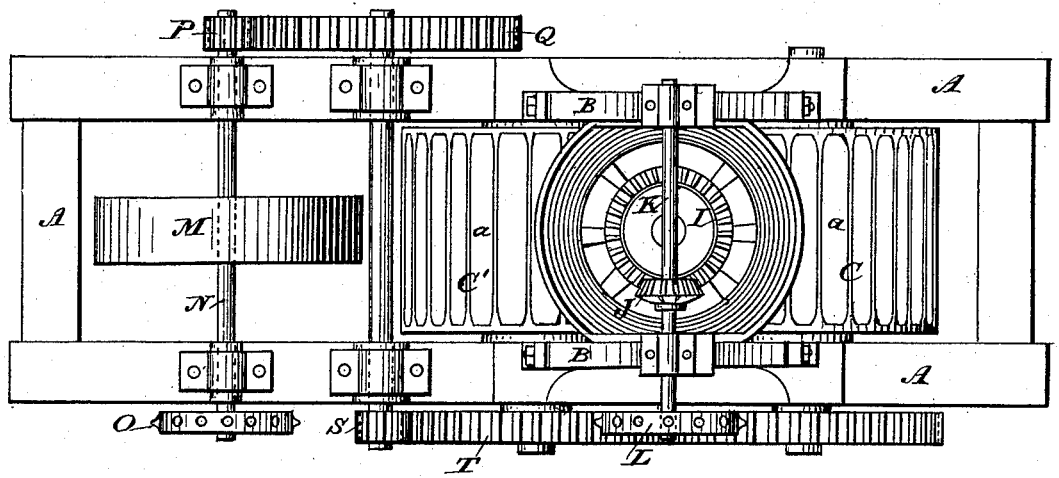
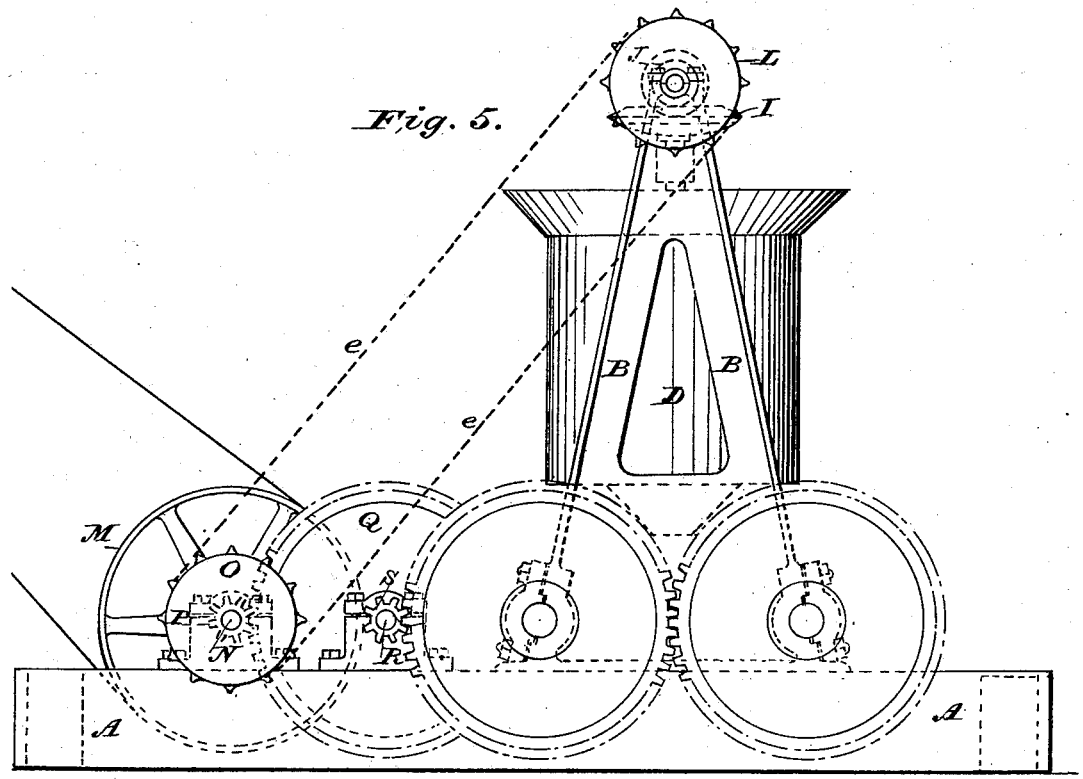
WITNESSES  INVENTOR
T. C. Brecht  George F. Brott
L. F. Keleher  Attorney

UNITED STATES PATENT OFFICE.

GEORGE F. BROTT, OF WASHINGTON, DISTRICT OF COLUMBIA.

MACHINE FOR PRESSING PLASTIC OR OTHER CONDITIONED MATERIAL INTO BLOCKS.

SPECIFICATION forming part of Letters Patent No. 266,013, dated October 17, 1882.

Application filed March 31, 1882. (No model.)

*To all whom it may concern:*

Be it known that I, GEORGE F. BROTT, a citizen of the United States of America, residing at Washington, in the District of Columbia, have invented certain new and useful Improvements in Machines for Pressing Plastic or other Conditioned Material into Blocks; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The object of my invention is to provide a machine having powerful compressing qualities, so that the material to be operated upon will leave said machine in its most solid and compact form, and will admit of being handled without danger of breaking or crumbling to pieces.

My improved machine may be used to advantage in the manufacture of bricks and paving-blocks of bituminous or other material, but is primarily designed for the manufacture of artificial fuel, such as described in Letters Patent No. 250,117, of November 29, 1881, granted to Platt B. Walker and Geo. F. Brott.

Referring to the drawings, Figure 1 is a side elevation of the machine. Fig. 2 is a rear end view of the same. Fig. 3 is a vertical cross-section of the same. Fig. 4 is a plan view of the machine. Fig. 5 is a side view, showing the gearing. Fig. 6 is the manufactured article.

A is the bed of the machine, which may consist of any suitable frame-work, and on which are mounted the operating parts of the machine, to be hereinafter more fully explained.

B B are standards or supports, of metal or other suitable material, secured firmly to the frame A for supporting the operating parts of the upper portion of the machine.

C and C' are compressing and shaping rollers, mounted in the standards B B, at the lower portion thereof, or upon the frame A A in suitable boxes. The rollers C and C' are by preference cast hollow, so as to be more easily handled and lessen the weight of the machine, and may, if necessary, be supplied with heating devices for keeping the same hot in cases where the material to be operated upon contains bituminous material. Recesses or cavities $a$, of any desired form or configuration, are made in the surface or periphery of the rollers for giving shape to the product, as is usual in this class of machines. The rollers or shaping and compressing cylinders are, moreover, mounted in separable bearings, as shown in Fig. 1, so that by removing the outer bearing or cap, $a'$, the rollers may be readily removed from the machine without disturbing the upper portions thereof. The caps $a'$ should be securely fastened to the main frame or standards B B, so as to sustain the backward thrust of the rollers when compressing and shaping the material.

D is a strong plate-metal cylinder, secured in a rigid manner to the standards B B by means of the brackets or angle-irons $b$. The lower end of the cylinder is contracted, or, in other words, is provided with converging sides $c\ c$, which project down into the opening between the compressing-cylinders, so as to contract the stream or column of material to be operated on and direct it between the said rollers or compressing-cylinders.

E is a shaft seated in the cross-bar F in the lower end of the cylinder D, the upper end of said shaft being collared and secured against upward thrust by the cross-bar G, which is secured to the standards B B. The shaft E is provided with screw-wings H, after the manner of that class of brick-machines in which the material is forced therefrom in a continuous stream or column, and by this means the material to be operated upon is delivered to the compressing and shaping rolls in a compressed condition, and is, in fact, subjected to two powerful compressing forces—the first by the screw and second by the rollers. The shaft E is provided with a beveled-gear wheel, I, which meshes with and receives its motive power from the gear-wheel J on the shaft K. The shaft K is mounted in suitable bearings in the standards B B, and is provided with a sprocket-wheel, L, or other suitable device for connecting it with the driving-power of the machine, as will more fully appear, and which I will now proceed to describe.

M is a band-pulley secured to the shaft N, which is mounted in suitable bearings in the base or frame A of the machine. The shaft N is provided with a sprocket or band wheel, O, and is connected to the sprocket or band wheel L by means of a chain or band, e, as shown in dotted lines in Fig. 5, and by which power is applied to the screw-shaft E. The sprocket or pulley wheels may be duplicated, or, in other words, two sprocket or band wheels may be secured to the shafts N and K, one at each end, and connected by chains or bands to impart greater compressing power to the screw-shaft, and to insure greater steadiness in the running of the machine, and at the same time distribute the strain to both the standards B B. The shaft N is also provided at each end with spur or gear wheel P, which meshes with a large gear-wheel, Q, secured to the shaft R, said shaft being secured in proper bearings in the frame A. The shaft R is also provided with a pinion-wheel, S, which meshes with the gear-wheel T on the shaft of the compressing and forming cylinder C'. The pinion or gear wheel T meshes with and imparts motion to the other compressing-cylinder, C, by means of the spur-gear U, attached to the shaft thereof, and thus a uniform motion in the same direction is given to the compressing-rollers C C', as indicated by the arrows in Fig. 5.

By interposing the spur-gears or pinions P and S and large gear-wheel Q between the power-applying pulley M and the pressing and forming rollers or cylinders C C', I impart to said rollers a slow, steady motion, and at the same time get a powerful pressure on the material. It will also be noticed that the screw-shaft is driven by power from the same shaft, so that there is a conjoint action of all the parts, and enabling the screw to feed the compressing-cylinders to the exact amount they can take.

In Fig. 6 I have shown the finished product; but it is obvious that the molding-cavities in the forming cylinders or rollers may be changed to produce an article of any desired configuration.

I have shown in Fig. 3 in dotted lines a mixing pan or hopper secured to the top of the cylinder or hopper D, where the material is first mixed—i. e., the sawdust and peat or coal-dust and peat are thoroughly mixed either by hand or by means of any suitable mechanism before being placed in the cylinder D, and before being subjected to the compressing-screw.

I am aware that a mixing-mill has been placed above compressing-rolls, and that adjustable hoppers have been used therewith to conduct the material to the compressing-rolls, and such I do not claim.

Having thus described my invention, what I do claim, and desire to secure by Letters Patent, is—

1. In a machine for compressing plastic or other conditioned material into blocks or forms, a primary compressing device located above or in such position as to deliver the material to be operated upon to the final shaping and compressing rolls in a compact, compressed, and continuous stream, as set forth.

2. The combination of the primary compressing-screw, with its surrounding cylinder, with the final compressing and shaping cylinders C C', as set forth.

3. The combination, in a machine for shaping plastic or other conditioned material, of the main driving-shaft, provided with pinion P and the intermediate gears, Q and S, with the compressing and shaping cylinders C C', as set forth.

GEORGE F. BROTT.

Witnesses:
T. C. BRECHT,
LLOYD KELEHER.